May 18, 1926.

W. E. BEE 1,585,361

REDUCTION GEARING

Filed Jan. 28, 1924     2 Sheets-Sheet 1

Inventor
William E. Bee

Attorney

May 18, 1926.  
W. E. BEE  
1,585,361  
REDUCTION GEARING  
Filed Jan. 28, 1924  2 Sheets-Sheet 2
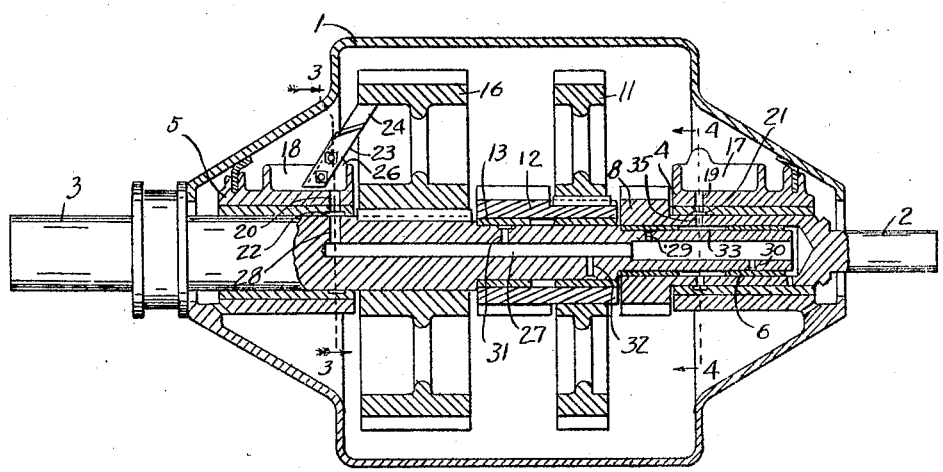
*Fig. 2.*
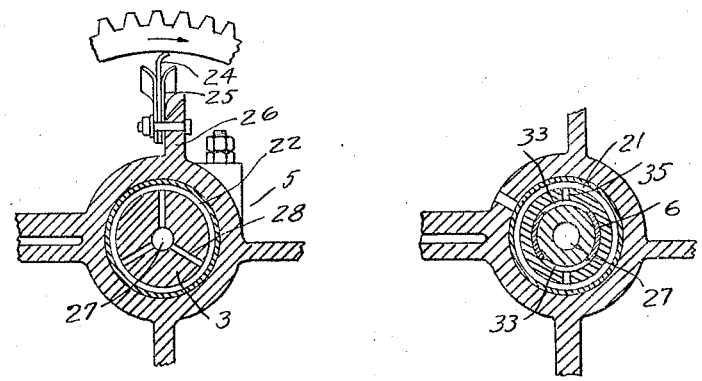
*Fig. 3.*  *Fig. 4.*
Inventor  
William E. Bee
By *Whittemore Hulbert Whittemore & Belknap*  
Attorney Patented May 18, 1926.

1,585,361

UNITED STATES PATENT OFFICE.

WILLIAM EDWARD BEE, OF DETROIT, MICHIGAN, ASSIGNOR TO PALMER-BEE COMPANY, OF DETROIT, MICHIGAN, A CORPORATION OF MICHIGAN.

REDUCTION GEARING.

Application filed January 28, 1924. Serial No. 689,118.

The invention relates to reduction gearing and refers more particularly to that type of reduction gearing in which the drive and driven shafts are in axial alignment, and one shaft is journalled in the other. One of the objects of the invention is the provision of means for assuring lubrication of the bearing between the drive and driven shafts. Another object is the provision of a lubricant passageway in one of the shafts which communicates with a lubricant chamber and leads to the bearing between the shafts as well as the bearing between one of the shafts and a gear rotatable thereon. A further object is the provision of a novel device for collecting and conducting lubricant to a lubricant chamber. With these as well as other objects in view the invention resides in the novel features of construction and combinations and arrangements of parts as more fully hereinafter set forth.

In the drawings:

Figure 2 is a cross section, partly in elevation, on the line 2—2 of Figure 1;

Figures 1, 5:
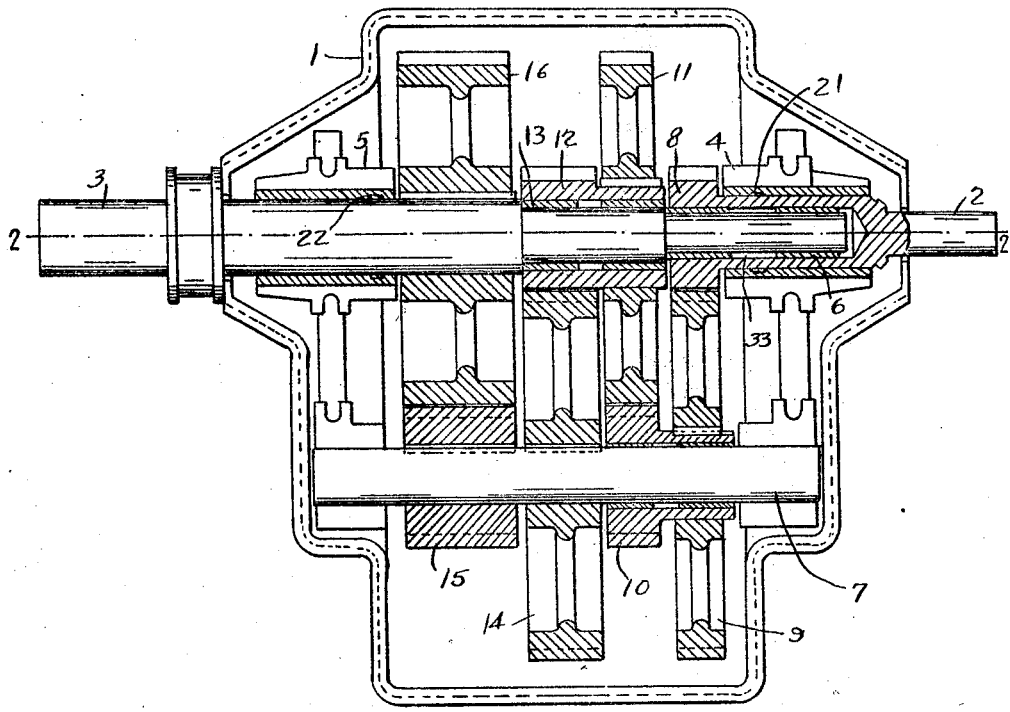
Figure 1 is a sectional plan view of a reduction gearing embodying my invention.

Figures 3 and 4 are cross sections respectively on the lines 3—3 and 4—4 of Figure 2;

Figure 5 is a side elevation of the bearing between the drive and driven shafts.

1 is the housing of the reduction gearing and 2 and 3 are respectively the drive and driven shafts extending through the opposite ends of the housing in axial alignment with each other and operatively connected by reducing gears. 4 and 5 are bearings at the ends of the housing in which the drive and driven shafts are respectively journalled, the diameters of the journalled portions being the same. The driven shaft 3 has a reduced inner end which is journalled within the hollow journalled portion at the inner end of the drive shaft 2, there being preferably the bearing or bushing 6 between the bearing surfaces of these shafts.

The reducing gears are mounted upon the drive and driven shafts and the countershaft 7 at one side of the drive and driven shafts. 8 is the pinion fixed upon the inner end of the drive shaft 2 and at the inner side of the bearing 4, this pinion, as shown in the present instance, being integral with the drive shaft. 9 is a gear meshing with the pinion 8, and secured upon the hub of a pinion 10 which is journalled upon the countershaft 7. The pinion 10 meshes with the gear 11 which is secured upon the hub of the pinion 12, which latter is journalled upon the driven shaft 3, there being preferably a bearing or a bushing 13 betwen the pinion and the driven shaft. 14 is a gear secured upon the counter shaft 7, 15 a pinion also secured upon the counter shaft, and 16 a gear secured upon the driven shaft and meshing with the pinion 15. The drive shaft 2 is suitably connected to a source of power such as an electric motor and may be rotated at a relatively high speed, and the driven shaft 3 is rotated at a much lower rate of speed owing to the reducing gears.

The bearings 4 and 5 have in their upper faces the recesses or chambers 17 and 18 respectively for lubricant and also have leading from these chambers the radial passageways 19 and 20 opening into annular grooves 21 and 22 respectively in the bearing faces of the bearings. The chamber 17 receives its lubricant by reason of the lubricant in the housing being splashed, during the operation of the gearing and some of this lubricant falling into the chamber. The chamber 18 receives its lubricant through a scraper 23 which collects lubricant carried upwardly by the gear 16 and conducts this lubricant to the chamber. This scraper 23 comprises an upwardly and inwardly inclined flexible fibrous member 24 preferably formed of leather, the upper end of which contacts with the inner surface of the rim of the gear 16. The scraper also includes the resilient reinforcing strips 25 on opposite sides of the fibrous member and having their upper ends spaced from the rim of the gear and bent transversely as well as inclined downwardly and outwardly to conduct the lubricant scraped off the gear to a point over the chamber 18. The lower ends of the fibrous member 24 and reinforcing strips 25 are suitably secured to the lug 26 extending upwardly at one side of the chamber 18. The outer edge of the fibrous member 24 terminates short of the outer edge of the reinforcing strips to form a channel for the lubricant.

27 is a lubricant passageway extending axially within the driven shaft 3 from its inner end to a point to be connected with the annular groove 22 by the radial passageways 28 in the driven shaft. This axial passageway is adapted to conduct lubricant from the chamber 18 to the bearings 6 and 13, there being the radial passageways 29 and 30 leading to the bearing 6 and the radial passageways 31 and 32 leading to the bearing 13. The bearing 6 is provided with the cutaway portions or notches 33 diametrically opposite each other and between its ends and also has in its inner face converging grooves 34 leading from the notches to its opposite ends. The radial passageways 29 and 30 are so located as to be beyond the notches 33 but register with the grooves 34 upon relative rotation of the bearing and the driven shaft. As a consequence, the lubricant is distributed over the inner face of the bearing. The chamber 17 also is adapted to communicate with the notches 33 of the bearing 6 through the radial passageways 35 in the drive shaft 2.

With this arrangement it will be seen that the bearing for the drive shaft as well as the bearing between the drive and driven shafts may be lubricated from the chamber 17 while the reduction gearing is not in use and also during slow speed of the drive shaft as when starting and stopping. In detail, lubricant can pass from the chamber 17 through the passageway 19, annular groove 21 and passageways 35 into the notches 33 in the bearing 6 and along the grooves 34, possibly entering the passageways 29 and 30 and the axial passageway 27 and leading to the bearing 13 through the radial passageways 31 and 32. While the reduction gearing is in use and the drive shaft is being rotated at a relatively high speed, the lubricant may not be able to flow inwardly through the passageways 35 to the bearing 6, due to the high centrifugal force, but by reason of the axial passageway 27, radial passageways 28 leading to the annular groove 22, and the axial passageways 29 and 30 leading to the bearing 6 and the axial passageways 31 and 32 leading to the bearing 13, lubrication of the bearing surfaces is assured since the driven shaft is rotated at a much lower rate of speed than the drive shaft. Furthermore, the scraper will operate to maintain lubricant in the chamber 18 which communicates with the annular groove 22 through the passageway 20. This latter system is known as the main lubricating system, while the first-mentioned system, which is operative but part of the time, is known as the auxiliary lubricating system.

What I claim as my invention is:

1. In a reduction gearing, the combination with a drive shaft, of a shaft driven thereby at a lower rate of rotation, said driven shaft being journalled in said drive shaft, bearings for said drive and driven shafts having chambers for lubricant, a gear rotatable upon said driven shaft and a longitudinally extending passageway in said driven shaft connected with said chambers and with the bearing surfaces between said drive and driven shafts and between said gear and the driven shaft.

2. The combination with a shaft, of a bearing for said shaft, a gear adjacent to said bearing, and an oiling device for said bearing comprising a flexible member engaging the rim of said gear, and stiffening members on opposite sides of said flexible member and forming a channel therewith, said flexible member and stiffening members being secured to said bearing.

3. The combination with a gear housing containing oil, of a shaft, a bearing within said housing for said shaft having a passageway leading from its upper side to said shaft, a gear adjacent to said bearing, and an oiling device comprising a fibrous member extending upwardly from said bearing into contact with the rim of said gear, and stiffening members on opposite sides of said fibrous member and forming a channel therewith, said stiffening members having their upper ends spaced from the rim of said gear, and said stiffening members and fibrous member being secured at their lower ends to said bearing.

4. In a reduction gearing, the combination with a drive shaft, of a shaft driven thereby at a lower rate of rotation extending within and journaled in said drive shaft, bearings for said drive and driven shafts having chambers for receiving lubricant and means for conducting lubricant from said chambers to the bearing surfaces between said drive and driven shafts including a passageway extending longitudinally in said driven shaft and connected with the chamber of the bearing for said driven shaft and with the bearing surfaces between said drive and driven shafts.

5. In a gearing, the combination with a pair of shafts rotatable at different speeds, the shaft rotatable at the lower speed extending within and journaled in the other shaft, a bearing for the shaft rotatable at lower speed having a chamber adapted to receive lubricant and a lubricant passageway in the shaft rotatable at lower speed connected with said chamber and with the bearing surfaces between said shafts.

6. In a gearing, the combination with a pair of shafts rotatable at different speeds, the shaft rotatable at lower speed extending within and journaled in the other shaft, of a bearing between said shafts, a bearing for the shaft rotatable at higher speed provided with a chamber for receiving lubricant, a passageway leading from said chamber to said first-mentioned bearing, a bearing for the shaft rotatable at lower speed provided with a chamber for receiving lubricant and means for conducting lubricant from said second-mentioned chamber to said first-mentioned bearing during the operation of the gearing, including a passageway extending longitudinally within the shaft rotatable at lower speed.

7. In a gearing, the combination with a pair of shafts rotatable at different speeds, the shaft rotatable at lower speed extending within and journaled in the other shaft, bearings for said shafts having chambers for receiving lubricant, a gear journaled upon the shaft rotatable at lower speed and a passageway in the shaft rotatable at lower speed connected with said chambers and with the bearing surfaces between said shafts and between said gear and the shaft rotatable at lower speed.

In testimony whereof I affix my signature.

WILLIAM EDWARD BEE.